(12) United States Patent
Gilano et al.

(10) Patent No.: US 6,392,527 B1
(45) Date of Patent: *May 21, 2002

(54) IMPACT DETECTION SYSTEM (75) Inventors: Michael Gilano, Irving, CA (US);
Gordon B. Langford, Sandy, UT (US)

(73) Assignee: Sensitron, Inc., Midvale, UT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/707,407

(22) Filed: Sep. 4, 1996

(51) Int. Cl.[7] ................................................. G01L 1/22
(52) U.S. Cl. ................................. 338/2; 338/6; 338/47; 338/50; 338/211; 73/862.634; 280/735
(58) Field of Search ............................. 338/2, 5, 6, 12, 338/13, 43, 46, 47, 50, 210, 211; 280/735, 757; 73/862.634, 514.24, 514.33, 514.34; 200/DIG. 32

(56) References Cited

U.S. PATENT DOCUMENTS

| | | | | |
|---|---|---|---|---|
| 3,113,223 A | * | 12/1963 | Smith et al. | 73/514.34 |
| 3,174,125 A | * | 3/1965 | Curby | |
| 3,229,511 A | * | 1/1966 | Rossire | |
| 3,327,270 A | * | 6/1967 | Garrison | 338/2 |
| 3,332,280 A | * | 7/1967 | Fish et al. | |
| 3,489,917 A | * | 1/1970 | Gurol | 280/735 |
| 3,517,999 A | * | 6/1970 | Weaver | |
| 3,541,491 A | * | 11/1970 | Worster | |
| 3,545,283 A | * | 12/1970 | McGunigle | 73/514.34 |
| 3,788,149 A | * | 1/1974 | Wilner | 73/514.12 |
| 3,820,529 A | * | 6/1974 | Gause et al. | |
| 3,878,711 A | * | 4/1975 | Randolph, Jr. | |
| 3,888,117 A | * | 6/1975 | Lewis | |
| 3,895,288 A | * | 7/1975 | Lampen et al. | |
| 3,958,455 A | * | 5/1976 | Russell | |
| 3,968,467 A | * | 7/1976 | Lampen et al. | |

(List continued on next page.)

FOREIGN PATENT DOCUMENTS

| | | | | |
|---|---|---|---|---|
| SU | 527665 | * | 9/1976 | 73/514.34 |
| WO | 91/13784 | * | 9/1991 | 280/735 |

*Primary Examiner*—Karl D. Easthom
(74) *Attorney, Agent, or Firm*—Holme Roberts & Owen LLP (57) ABSTRACT

An acceleration change detection system, which in a preferred embodiment is used as an impact detection system, detects whether a deflection sensor is deflected. The magnitude and/or direction of the impact may be considered. The system may include one or more than one deflection sensor. The invention may have particular use in a system that determines whether to deploy an air bag in a vehicle. The system may employ an open or enclosed chassis. The deflection sensors may deflect against deflection structures, which may be in various shapes. The deflection sensors have an electrical parameter (such as resistance) that changes upon deflection of the deflection sensor. In certain embodiments, the deflection sensor is ordinarily held in place by a movement inhibitor, which may include, for example, a magnetic, spring, clip, or stiff substrate. A large impact may create a force great enough to overcome the magnetic or mechanical force of the movement inhibitor. Deflection sensors may be arranged to detect movement in the x, −x, y, −y, z, and −z directions. Electrical circuitry may produce a voltage that is indicative of the change in resistance, which in turn is indicative of the extent of deflection. The extent of deflection is an indication of the magnitude of the impact. Determining circuitry interprets changes in the electrical parameter(s) to determine information regarding the impact and, perhaps, trigger an air bag. The movement detection system also may be used to detect skidding or other movement of the vehicle.

5 Claims, 8 Drawing Sheets

U.S. PATENT DOCUMENTS

| | | | |
|---|---|---|---|
| 3,971,250 A | * | 7/1976 | Taylor |
| 4,023,054 A | * | 5/1977 | Taylor |
| 4,038,867 A | * | 8/1977 | Andrews et al. |
| 4,123,158 A | * | 10/1978 | Reytblatt |
| 4,152,304 A | * | 5/1979 | Tadewald |
| 4,191,470 A | * | 3/1980 | Butter |
| 4,235,141 A | | 11/1980 | Eventoff |
| 4,252,391 A | * | 2/1981 | Sado |
| 4,258,100 A | * | 3/1981 | Fujitani et al. |
| 4,258,720 A | | 3/1981 | Flowers |
| 4,268,815 A | | 5/1981 | Eventoff |
| 4,269,506 A | | 5/1981 | Johnson et al. |
| 4,273,682 A | | 6/1981 | Kanamori |
| 4,276,538 A | | 6/1981 | Eventoff |
| 4,301,337 A | | 11/1981 | Eventoff |
| 4,306,480 A | | 12/1981 | Eventoff |
| 4,314,227 A | | 2/1982 | Eventoff |
| 4,314,228 A | | 2/1982 | Eventoff |
| 4,315,238 A | | 2/1982 | Eventoff |
| 4,355,692 A | | 10/1982 | Ostrelich |
| 4,414,537 A | | 11/1983 | Grimes |
| 4,420,251 A | | 12/1983 | James et al. |
| 4,429,580 A | | 2/1984 | Testa et al. |
| 4,444,205 A | | 4/1984 | Jackson |
| 4,451,714 A | | 5/1984 | Eventoff |
| 4,461,085 A | | 7/1984 | Dewar et al. |
| 4,489,302 A | | 12/1984 | Eventoff |
| 4,503,705 A | | 3/1985 | Polchaninoff |
| 4,542,291 A | | 9/1985 | Zimmerman |
| RE32,003 E | | 10/1985 | Shoberg |
| 4,575,117 A | | 3/1986 | Uchida |
| 4,605,593 A | | 8/1986 | Iida |
| 4,639,711 A | | 1/1987 | Edholm et al. |
| 4,649,784 A | | 3/1987 | Fulks et al. |
| 4,703,335 A | | 10/1987 | Matsushita et al. |
| 4,715,235 A | | 12/1987 | Fukui et al. |
| 4,729,809 A | | 3/1988 | Dery et al. |
| 4,745,930 A | | 5/1988 | Confer |
| 4,748,433 A | | 5/1988 | Jackson et al. |
| 4,763,534 A | | 8/1988 | Hager |
| 4,786,764 A | | 11/1988 | Padula et al. |
| 4,810,992 A | | 3/1989 | Eventoff |
| 4,822,040 A | | 4/1989 | Raditic |
| 4,825,696 A | * | 5/1989 | Seipler .................. 5/198 |
| 4,837,548 A | | 6/1989 | Lodini |
| 4,876,419 A | | 10/1989 | Lodini |
| 4,968,965 A | | 11/1990 | Naitou et al. |
| 4,979,763 A | | 12/1990 | Blackburn |
| 5,002,306 A | | 3/1991 | Hiramitsu et al. |
| 5,059,751 A | * | 10/1991 | Woodman et al. ............ 10/199 |
| 5,065,322 A | | 11/1991 | Mazur et al. |
| 5,086,785 A | | 2/1992 | Gentile et al. |
| 5,109,341 A | | 4/1992 | Blackburn et al. |
| 5,134,248 A | | 7/1992 | Kiec et al. |
| 5,157,372 A | | 10/1992 | Langford |
| 5,172,790 A | | 12/1992 | Ishikawa et al. |
| 5,202,281 A | | 4/1993 | Ishibashi |
| 5,202,831 A | | 4/1993 | Blackburn et al. |
| 5,216,607 A | | 6/1993 | Diller et al. |
| 5,222,399 A | | 6/1993 | Kropp |
| 5,232,243 A | | 8/1993 | Blackburn et al. |
| 5,250,227 A | | 10/1993 | Margolin |
| 5,265,904 A | | 11/1993 | Shelton |
| 5,265,905 A | | 11/1993 | Shelton |
| 5,269,559 A | | 12/1993 | Filion et al. |
| 5,269,560 A | | 12/1993 | O'Loughlin et al. |
| 5,275,432 A | | 1/1994 | Pray et al. |
| 5,297,976 A | | 3/1994 | VanDerStuyf et al. |
| 5,308,106 A | | 5/1994 | Heidorn et al. |
| 5,309,135 A | | 5/1994 | Langford |
| 5,313,023 A | | 5/1994 | Johnson |
| 5,344,185 A | | 9/1994 | Cooke, II |
| 5,350,189 A | | 9/1994 | Tsuchitani et al. |
| 5,364,125 A | | 11/1994 | Brown et al. |
| 5,366,242 A | | 11/1994 | Faigle et al. |
| 5,369,232 A | | 11/1994 | Leonelli |
| 5,371,333 A | | 12/1994 | Kanai et al. |
| 5,383,473 A | | 1/1995 | Moberg |
| 5,387,819 A | | 2/1995 | Ueno et al. |
| 5,388,459 A | | 2/1995 | Inoue et al. |
| 5,395,802 A | | 3/1995 | Kiyota et al. |
| 5,396,439 A | | 3/1995 | Yamada |
| 5,398,962 A | | 3/1995 | Kropp et al. |
| 5,399,819 A | | 3/1995 | Lang et al. |
| 5,413,378 A | | 5/1995 | Steffens, Jr. et al. |
| 5,419,176 A | | 5/1995 | Walker |
| 5,423,227 A | * | 6/1995 | Polaert et al. ......... 73/862.634 |
| 5,423,569 A | | 6/1995 | Reighard et al. |
| 5,439,249 A | | 8/1995 | Steffens, Jr. et al. |
| 5,441,302 A | | 8/1995 | Johnson et al. |
| 5,443,284 A | | 8/1995 | Strahl et al. |
| 5,443,286 A | | 8/1995 | Cunningham et al. |
| 5,447,327 A | | 9/1995 | Jarboe et al. |
| 5,454,589 A | | 10/1995 | Bosio et al. |
| 5,454,591 A | | 10/1995 | Mazur et al. |
| 5,456,492 A | | 10/1995 | Smith et al. |
| 5,458,366 A | | 10/1995 | Hock et al. |
| 5,460,405 A | | 10/1995 | Faigle et al. |
| 5,470,105 A | | 11/1995 | Rose et al. |
| 5,474,328 A | | 12/1995 | Nilsson |
| 5,478,111 A | | 12/1995 | Marchant et al. |
| 5,480,185 A | | 1/1996 | Lowe et al. |
| 5,483,845 A | | 1/1996 | Stein et al. |
| 5,489,119 A | | 2/1996 | Prescaro et al. |
| 5,489,806 A | | 2/1996 | Harris et al. |
| 5,490,411 A | | 2/1996 | Hogan |
| 5,494,311 A | | 2/1996 | Blackburn et al. |
| 5,515,725 A | | 5/1996 | Tabota et al. |
| 5,531,472 A | | 7/1996 | Semchena et al. |
| 5,583,476 A | | 12/1996 | Langford |
| 5,614,673 A | * | 3/1997 | Yamamoto ............... 73/514.33 |
| 5,625,333 A | * | 4/1997 | Clark et al. .................... 338/2 |
| 5,665,914 A | * | 9/1997 | Yamamoto ............... 73/514.33 |

* cited by examiner

IMPACT DETECTION SYSTEM

BACKGROUND OF THE INVENTION

1. Field of the Invention

The invention relates to an acceleration change detection system, which in a preferred embodiment is used as an impact detection system. More particularly, the invention relates to such a system that employs a deflection sensor. The invention may have particular use in a system that determines whether to deploy an air bag in a vehicle.

2. State of the Art

Detection of movement and forces has wide application. For example, automobile air bag systems employ accelerometers in determining whether to inflate the air bag.

Prior art detectors used in deploying air bags have included a cylinder in which a ball is ordinarily held in place by a magnet at one end of the cylinder. A spring is positioned at the other end of cylinder. The cylinder and the ball are gold plated to be electrically conductive. When the vehicle has a collision at the front, the vehicle including the cylinder rapidly decelerates. When there is sufficient force, the ball breaks loose from the magnet and travels toward the spring. Accordingly, the magnet is chosen to have enough magnetic force to hold the ball in place unless a threshold force is created through a collision. The threshold force varies depending on vehicle specifications.

When the ball strikes the spring, an electrical circuit is completed, causing a squib switch to be activated and in turn causing an explosion which inflates an air bag.

Disadvantages of the prior art detection system include that it detects an impact in only one direction and generally lacks flexibility of application.

Accordingly, there is a need for an impact detection system that will detect impact in various directions and has flexibility in applications.

SUMMARY OF THE INVENTION

An acceleration change detection system includes a deflection sensor having an electrical parameter that changes upon deflection of the deflection sensor. The deflection sensor may be a flexible potentiometer. The deflection sensor may be deflected against a deflection structure. The deflection structure may include any of a variety of shapes. A non-pivoting attachment may also facilitate deflection. The system may include a movement inhibitor that ordinarily prevents the deflection sensor from deflecting within a particular range of deflection, but that allows deflection within the particular range in response to sufficient change in acceleration of the movement inhibitor. Examples of a movement inhibitor include magnets, springs, and clips. A particularly stiff substrate of the deflection sensor may also inhibit movement.

Determining circuitry that is connected to the deflection sensor may generate a signal indicative of a value of the electrical parameter and determine whether the deflection sensor is deflecting within the particular range based on the indicative signal. The determining circuitry may respond to merely the presence of deflection, that the deflection exceeds a threshold, or to a particular value of a threshold. In each case, the deflection is within a range. The system may include air bag triggering circuitry for triggering an air bag.

The system may include more than one deflection sensor, each having an electrical parameter that changes upon deflection of the deflection sensor for detecting deflections in various directions. The deflection sensors may be joined in a group (for example, to a chassis and/or in a loop) or separated. The determining circuitry may generate signals indicative of values of electrical parameters of the additional deflection sensors, and determines whether the deflection sensors are deflecting within particular ranges based on the indicative signals. Vector mathematics may be used to determine a direction.

Deflection values may be stored for forensic purposes.

BRIEF DESCRIPTION OF THE DRAWINGS

While the specification concludes with claims particularly pointing out and distinctly claiming that which is regarded as the present invention, the advantages of this invention can be more readily ascertained from the following description of the invention when read in conjunction with the accompanying drawings in which:

DETAILED DESCRIPTION OF PREFERRED EMBODIMENTS

Figure 1A:
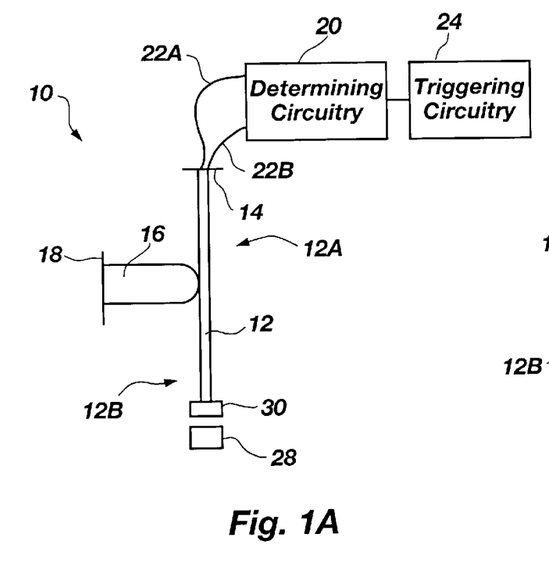
FIG. 1A is a partially schematic side view of one embodiment of an acceleration change detection system according to the present invention shown in the ordinary position.
Figure 1B:
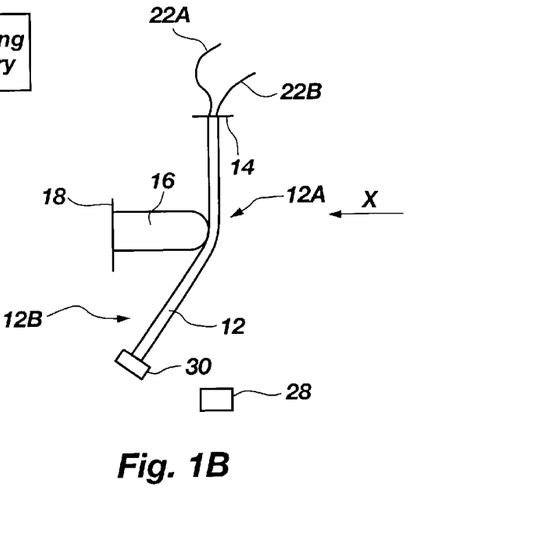
FIG. 1B is a partially schematic side view of the embodiment of FIG. 1A shown in an activated position.

Referring to FIGS. 1A and 1B, one embodiment of an acceleration change detection system 10 includes a flexible potentiometer 12 suspended from a support 14. Various deflection sensors other than a flexible potentiometer may be used. Detection system 10 may detect a change in acceleration from zero acceleration (i.e. no speed or constant speed) to a positive acceleration or negative acceleration (also called a deceleration). Detection system 10 may detect a change in acceleration from one non-zero acceleration to a different non-zero acceleration. Acceleration change detection system 10 may be used as an impact detection system.

A flexible potentiometer has a resistance (which is an example of an electrical parameter) that changes as the flexible potentiometer is deflected. Details regarding flexible potentiometers are discussed below. The flexible potentiometer has a first portion 12A and a second portion 12B with the second portion 12B deflecting relative to the first portion 12A as shown in FIGS. 1A and 1B. The resistance of flexible potentiometer 12 changes as it is deflected about a deflection structure 16 as shown in FIG. 1B. Deflection structure 16 is supported by a support 18. Supports 14 and 18 may be part of or attached to any of various structural pieces of an automobile.

The value of the resistance (or other electrical parameter) is measured by determining circuitry 20 through conductors 22A and 22B. Determining circuitry 20 may determine an actual value of the electrical parameter or whether it, for example, merely exceeds a threshold. Triggering circuitry 24 may trigger various devices including, for example, a device to inflate an air bag and an anti-skid device.

As shown in the drawings, the deflection structure may be any of a variety of structures against which a deflection sensor may deflect.

A magnetic post 28 acts as a movement inhibitor to flexible potentiometer 12 to which a magnet 30 is attached. Magnetic post 28 and magnet 30 are examples of magnetic pieces. Ordinarily, the magnetic attraction between magnetic post 28 and magnet 30 is great enough to keep flexible potentiometer 12 from significantly deflecting about deflection structure 16. As an example, support 14, deflection structure 16, and magnetic post 28 are traveling in the x direction and have a large deceleration (which is a negative acceleration). There is a tendency for magnet 30 and flexible potentiometer 12 to continue to travel in direction x. If the tendency is great enough, the magnetic attraction between magnetic post 28 and magnet 30 is overcome and flexible potentiometer 12 deflects about deflection structure 16.

The flexibility of the substrate of flexible potentiometer 12 may vary. In some embodiments, the substrate may be so stiff that a movement inhibitor is not required.

Figure 2A:
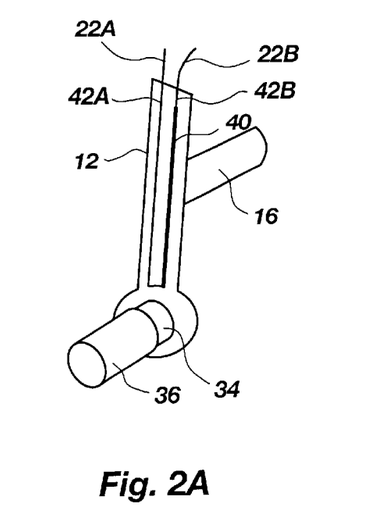
FIG. 2A is a partially schematic perspective view of another embodiment of an acceleration change detection system according to the present invention shown in the ordinary position.
Figure 2B:
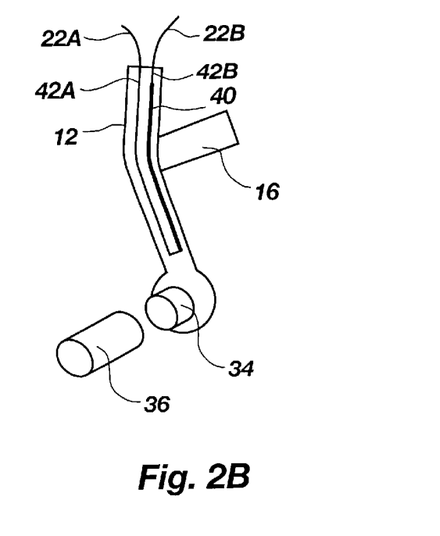
FIG. 2B is a partially schematic perspective view of the embodiment of FIG. 2A shown in an activated position.

FIGS. 2A and 2B show another embodiment of an acceleration change detection system in which a flexible potentiometer 12 is ordinarily held in place by the attraction between magnetic pieces 34 and 36, but deflects about deflection structure 16 in response to a great change in acceleration. In one embodiment of flexible potentiometer 12, a variable resistive material 40 is deposited on a substrate between conductors 42A and 42B, which are connected to conductors 22A and 22B.

Figure 3A:
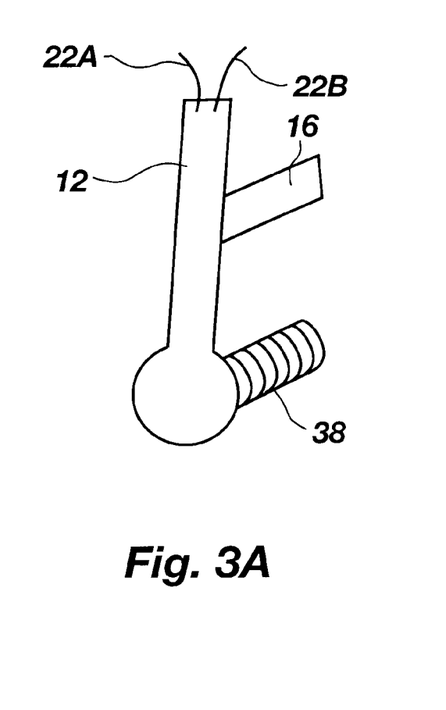
FIG. 3A is a partially schematic perspective view of another embodiment of an acceleration change detection system according to the present invention shown in the ordinary position.
Figure 3B:
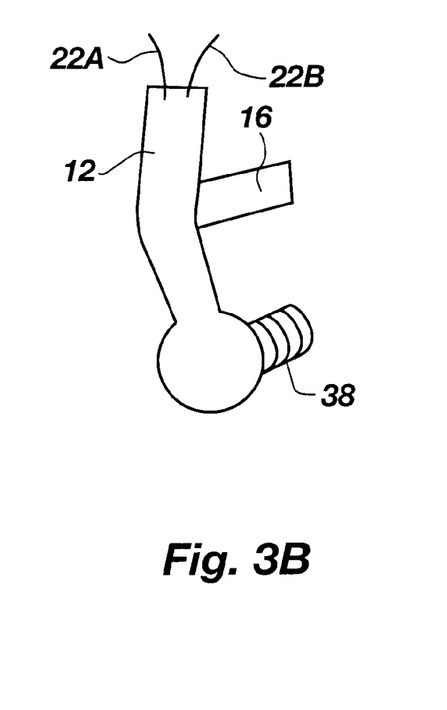
FIG. 3B is a partially schematic perspective view of the embodiment of FIG. 3A shown in an activated position.

FIGS. 3A and 3B show still another embodiment of an acceleration change detection system in which a spring 38 is a movement inhibitor. Flexible potentiometer 12 may be connected to spring 38 or merely rest against it.

Figure 4A:
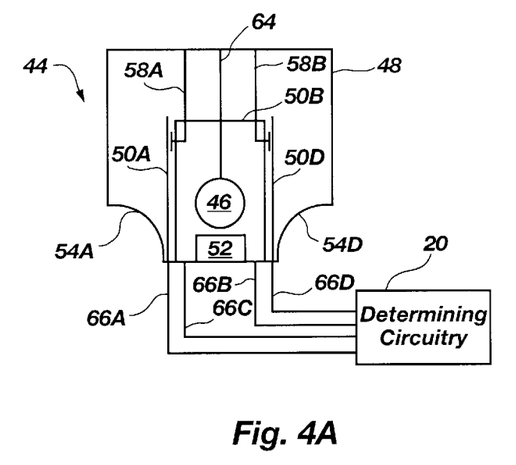
FIG. 4A is a partially schematic side view of another embodiment of an acceleration change detection system having multiple deflection sensors in ordinary positions.
Figure 4B:
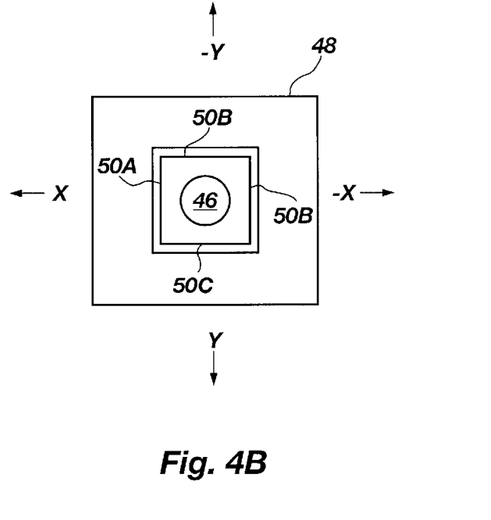
FIG. 4B is a top view of the system of FIG. 4A.
Figure 4C:
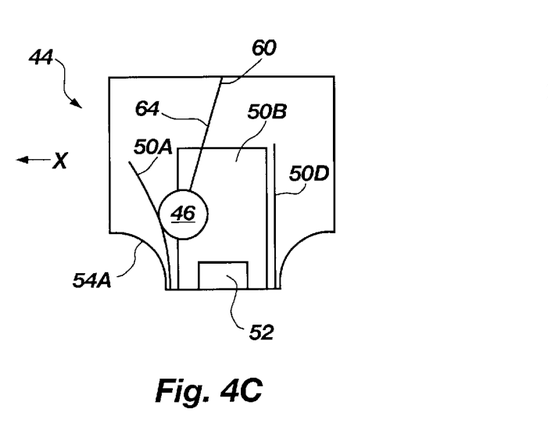
FIG. 4C is a side view of the system of FIG. 4A in an activated state.

Another embodiment of the invention is illustrated in FIGS. 4A, 4B, and 4C. Referring to FIGS. 4A–4C, an acceleration change detection system 44 includes an actuator 46 suspended by a cable 64 from a chassis 48. Acceleration change detection system 44 may be used as an impact detection system. Actuator 46 is shown to be spherical, but may be various other shapes including cylindrical or rectangular solid. Actuator 46 is magnetic and ordinarily held in position by a magnetic post 52. Actuator 46 may be very close to or touching magnetic post 52.

Flexible deflection sensors 50A, 50B, 50C (not shown in FIG. 4A), and 50D, which may be flexible potentiometers, are joined at the bottom to chassis 48 (but could be joined at the top or some other position). Chassis 48 includes deflection structures 54A, 54B (not shown), and 54C (not shown), and 54D. Deflection sensors 50A, 50B, 50C, and 50D have an electrical parameter (such as resistance) that changes when the deflection sensors 50A, 50B, 50C, and 50D are deflected. In the embodiment shown in FIG. 4A, deflection sensors 50A, 50B, 50C, and 50D would preferably experience the change in parameter only when deflected in the direction of a corresponding deflection structure. For example, deflection sensor 50A would experience the change in parameter only when deflected in the direction of deflection structure 54A. Optional restraining devices 58A and 58D prevent movement in the other direction. (Corresponding optional restraining devices 58B and 58C are not shown to avoid clutter.)

For convenience, the following nomenclature is used. The x direction is toward the front of the vehicle, and the −x direction is toward the rear of the vehicle. The y direction and −y direction are toward the driver side and passenger side of the vehicle, respectively. The z direction and −z direction are toward the top and bottom of the vehicle, respectively.

The vehicle (or other object) to which chassis 48 is connected may experience a sudden acceleration, perhaps because of a crash. In such a case, chassis 48 (including restraining devices 58 and magnetic post 52) also experience the sudden acceleration. Depending on the circumstances, the acceleration may be positive in one or more directions and negative in one or more directions. Positive acceleration is an increase in speed in a given direction. Negative acceleration (also called deceleration) is a decrease in speed in a given direction.

For example, if a forward moving vehicle has a head on crash, there will be at least a negative acceleration (or deceleration) in the x direction. On the other hand, if a stationary vehicle or a vehicle traveling in reverse has a head on crash, there will be at least a positive acceleration in the −x direction. If a vehicle has a crash on the passenger side, there will ordinarily be at least a positive acceleration in the y direction.

As an example, referring to FIG. 4C, when the vehicle is quickly moving and has a head-on crash, chassis 48 experiences a large negative acceleration (or deceleration) in the x direction. However, actuator 46 may pivot about a connection point 60 of cable 64 and, therefore, has a tendency to remain moving at a constant speed. If the impact force is great enough, the magnetic force between actuator 46 and magnetic post 52 will be overcome. If the magnetic force is overcome, deflection sensor 50A will be deflected about deflection structure 54A, as shown in FIG. 4C.

Deflection sensors 50A, 50B, 50C, and 50D are connected to determining circuitry 20 through conductors 66A, 66B, 66C, and 66D respectively. (Additional conductors may carry signals from other deflection sensors, discussed below.) As it is deflected, the parameter (such as resistance) of deflection sensor 50A changes. The change is detected by determining circuitry 20 through conductor 66A. Based on the change in the parameter, and perhaps some other conditions such as the speed of the vehicle, determining circuitry 20 determines whether and how to respond to the change. In the case where more than one deflection sensor is deflected, determining circuitry 20 may use vector mathematics to determine the direction of the movement and, thereby, the impact. In certain embodiments of the invention, different air bags may be deployed depending on the direction of the impact. For example, a side door air bag could be deployed in response to a side impact. Alternatively, multiple air bags could be deployed. Also, the system may detect which seats are occupied and not deploy air bags toward a seat to which no one is seated. The presence of some one in a seat may be detected through deflection of one or more flexible potentiometers in the base of an automobile seat and/or the back of an automobile seat.

Depending on its design, determining circuitry 20 may respond to any change in the parameter at all, or only to a change in the parameter that exceeds a threshold. In this respect, the impact may have to be sufficient to overcome both the magnetic force of magnet 52 and to cause a sufficient deflection in deflection sensor 50A. Deflection sensor 50A may include a stiff substrate that would tend to resist deflection. However, in some cases, unless there is some means (such as a clip or strong spring) for keeping deflection sensor 50A stationary, it will move in response to various changes in the speed of the vehicle. Accordingly, in many cases, determining circuitry 20 will respond only when the change in parameter exceeds a threshold. In the case in which there is an external deflection structure, deflection sensors may or may not pivot at the point of connection of the deflection sensor to a support surface. In the case in which there is no external deflection structure, it is preferred that the deflection structures do not pivot at the point of connection to facilitate deflection.

Still referring to FIG. 4C, if the vehicle is stationary and is struck head on by a rapidly moving vehicle, chassis 48 (including post 52) experiences an acceleration in the −x direction. Actuator 46 has a tendency to remain stationary. If the impact force is great enough, the magnetic force between actuator 46 and magnetic post 52 will be overcome and deflection sensor 50A will be deflected about deflection structure 54A by actuator 46. Depending on the strength of the magnetic force, flexibility of deflection sensor 50A, and programming of determining circuitry 20, a stationary vehicle must be struck by another vehicle having great momentum to cause activation of air bag(s).

Deflection sensor 50D may be unnecessary in a vehicle system that is not designed to activate an air bag(s) in response to a rear collision. However, deflection sensor 50D may serve other purposes, such as determining the direction of a collision in combination with one or more of sensors 50A, 50B, and 50C. Such information may be useful for forensic purposes.

Four or more flexible potentiometers 12 could be arranged each on the outside of a common deflection structure.

Figure 4D:
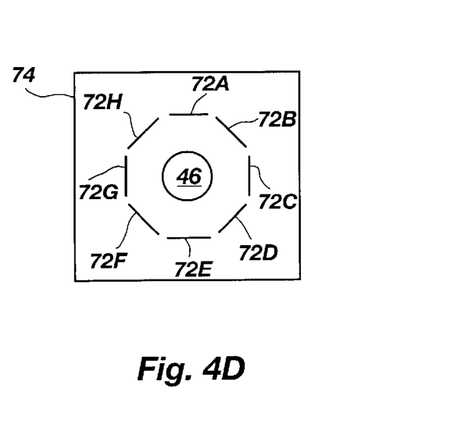
FIG. 4D is a top view of an alternative system of sensors that may be formed in a loop.

FIG. 4D shows an alternative to the embodiments of FIGS. 4A–4C, in which eight deflection sensors 72A–72H are employed. The substrates of such deflection sensors may form a cylindrical loop.

Chassis 48 is not necessary, although some sort of support structure is. An enclosed chassis may be useful in keeping dirt or other foreign particles from interfering with components of impact detection system 44.

Figure 5A:
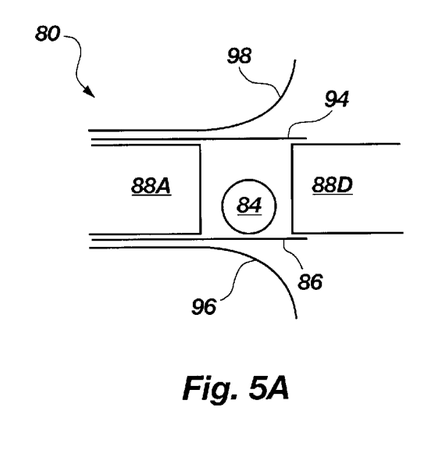
FIG. 5A is a cross-sectional side view of a detection system that detects a significant change in acceleration in the z direction.

Various sensing systems could be used to detect acceleration in the z direction or a −z direction. For example, referring to FIG. 5A, a sensing system 80 includes an actuator 84 (shown in, for example, a spherical shape) that is supported by a deflection sensor 86. Support structures 88A, 88B (not shown), 88C (not shown), and 88D are connected to the vehicle and prevent actuator 84 from moving substantially in a lateral direction. Deflection sensor 86 may have substantial rigidity so that it ordinarily is not substantially deflected. Sensing system 80 may also include a deflection sensor 94 positioned above actuator 84 (i e., in the z-direction). Deflection sensor 94 may have very little rigidity so that it is easily deflected. Deflection structures 96 and 98 are positioned near deflection sensors 86 and 94.

Figure 5B:
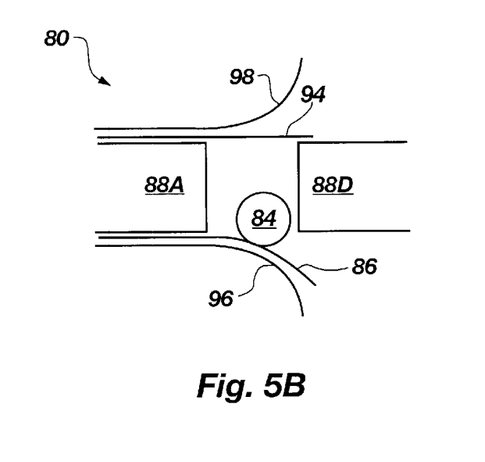
FIG. 5B is a cross-sectional side view of a detection system that detects a significant change in acceleration in the −z direction.

Referring to FIG. 5B, when the vehicle rapidly rises, deflection sensors 86 and 94, support structures 88A and 88D, and deflection structures 96 and 98 rise with the vehicle. However, as deflection sensor 86 rises, the weight of actuator 84 tends to deflect deflection sensor 86 about deflection structure 96.

Figure 5C:
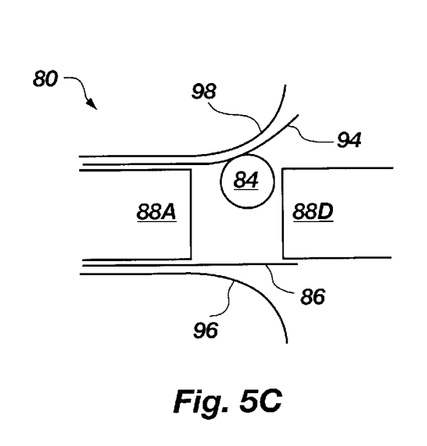
FIG. 5C is a cross-sectional side view of a detection system that detects a significant change in acceleration in the z and −z direction.

Referring to FIG. 5C, when the vehicle rapidly lowers, deflection sensors 86 and 94, support structures 88A and 88D, and deflection structures 96 and 98 lower with the vehicle. However, as deflection sensor 94 lowers it is struck by actuator 84, which momentarily remains stationary, and thereby deflects against deflection structure 98.

Figure 5D:
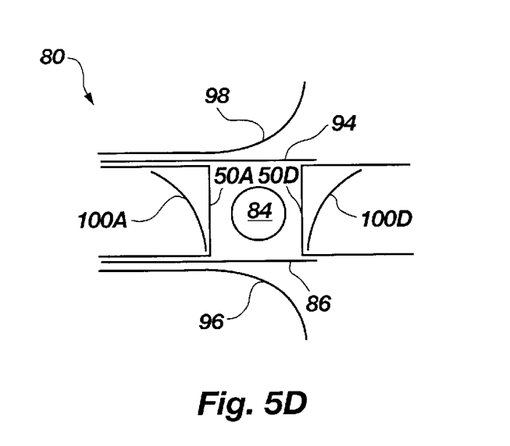
FIG. 5D is a cross-sectional side view of a detection system that detects a significant change in acceleration in six directions.

FIG. 5D shows an embodiment in which side support walls 88 are replaced by deflection sensors (e.g. deflection sensors 50A and 50D) to provide a system that detects in six directions (x, −x, y, −y, z, and −z). Deflection structures 100A, 100B (not shown), 100C (not shown), and 100D facilitate deflection of deflection sensors 50A, 50B (not shown), 50C (not shown), and 50D.

Figure 6:
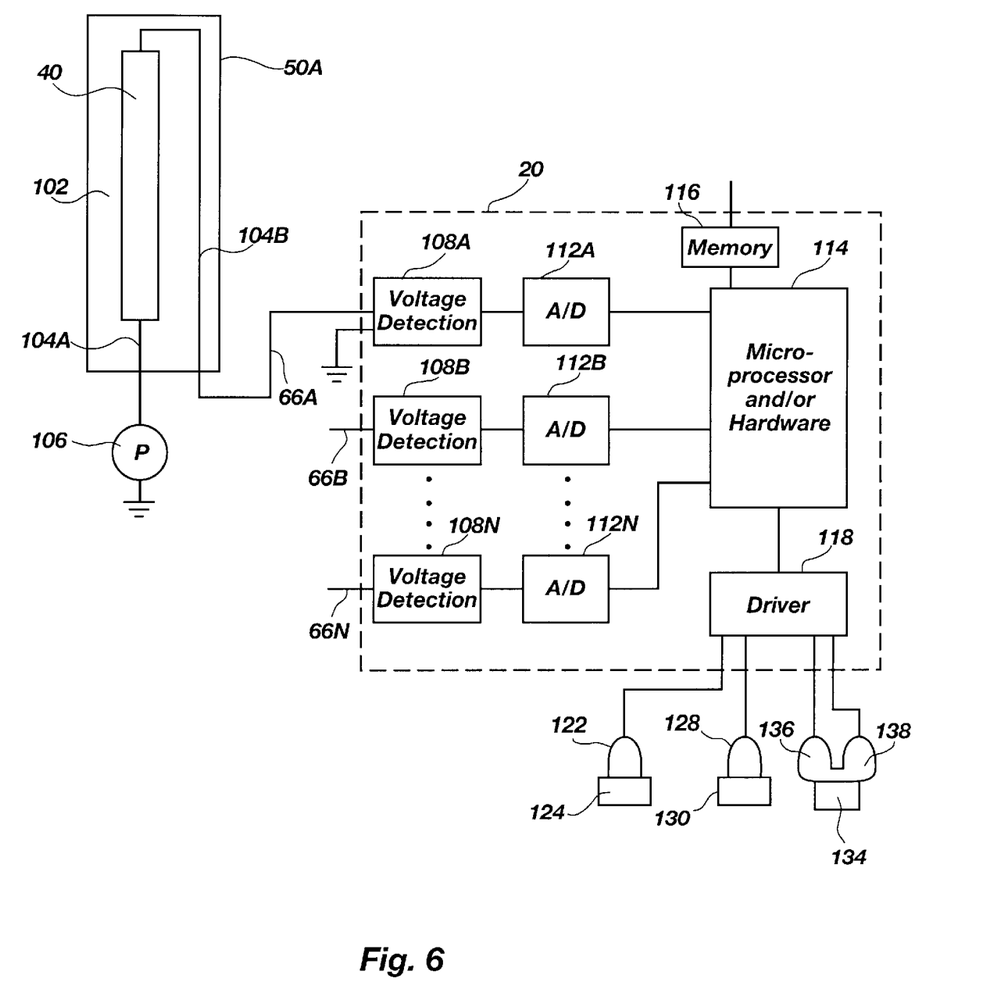
FIG. 6 is a more detailed schematic block diagram representation of a portion of the system of FIGS. 1A and 4A.

FIG. 6 shows details of an example of determining circuitry 20. Referring to FIG. 6, in a preferred embodiment deflection sensor 50A is a flexible potentiometer having a substrate 102 on which variable resistance material 40 is applied between conductors 104A and 104B. The relative proportions are not necessarily to scale. A power supply 106

(such as a constant voltage or constant current supply) causes a voltage drop across variable resistance material 40 between conductors 104A and 104B. The voltage drop is detected by voltage detection circuit 108A, the output of which is supplied to an analog-to-digital converter (A/D) 112A. A microprocessor and/or dedicated hardware circuitry 114 interprets the digital voltages to decide the extent of deflection if any. The magnitude of the deflection is related to the magnitude of the voltage. The magnitude of an impact may be related to the magnitude of the deflection. Alternatively, conductor 66A may be supplied directly to A/D 112A or directly to dedicated hardware circuitry 114. Dedicated hardware circuitry 114 may be analog and/or digital.

The extent of deflection of additional deflection sensors may be determined through conductors 66B ... 66N, voltage detection circuits 108B ... 108N, and A/D 112B ... 112N. As noted, depending on the design, voltage detection circuits 108B ... 108N, and/or A/D 112B ... 112N are not necessary to supply voltages to microprocessor and/or dedicated hardware 114.

Where more than one deflection sensor is used, determining circuitry may use vector mathematics to determine a direction. An optional memory 116 is used to store data related to deflection for forensic purposes.

A look-up table or equation may be used. In developing the data for the look-up table or the equation, one could consider the force necessary to overcome the magnetic force, and the amount of force dissipated before the impact reached impact detection system 44. Data could be gathered empirically through comparing the values of voltages on conductors 66 during various crashes. In short, various analyses could be used as well as various existing or yet to be obtained data.

It is not necessary to consider the absolute value or the change in resistance of variable resistance material 40. Rather, the values or changes in values of voltages would be sufficient for most purposes.

A single voltage determining circuit and A/D could be used by switching between conductors 66A, 66B, ... 66N.

In a preferred embodiment, when the voltage or change in voltage exceeds a threshold, microprocessor or dedicated hardware 114 activates a driver 118, which in turn may activate a squib to inflate an air bag. For example, if deflection sensor 50A is deflected beyond a threshold, microprocessor 114 may activate a squib 122 thereby inflating an air bag 124. Deflection of deflection sensor 50B beyond a threshold may lead to activation of a squib 128 and inflation of a different air bag 130 (e.g. a side door air bag). Alternatively, both air bag 124 and 130 could be inflated in response to deflection of a single deflection sensor. Deflection of one or more deflection sensors could lead to the inflation of an air bag 134. Deflection to a certain level could lead to activation of a first squib 136, while deflection to a greater level could lead to activation of a second squib 138, which causes a greater inflation of air bag 134. Under one embodiment of the invention, squib 138 would have a greater amount of explosive than in squib 136. Alternatively, or in addition, a sensor (such as a deflection sensor) in a seat could determine the weight of the person sitting in the seat. Squib 136 could be activated if a lighter person were sitting in the seat, while squib 138 could be activated if an heavier person were sitting in the seat. Still alternatively or in addition, the weight of the person or the amount of the deflection could control the timing of the inflation of the air bag.

Microprocessor or dedicated hardware 114 may build in a delay depending on the direction and/or magnitude of the impact. Microprocessor or dedicated hardware 114 may also factor in the presence and/or weight of a person who would be in the path of an air bag in determining whether or how much to inflate an air bag.

Figure 7A:
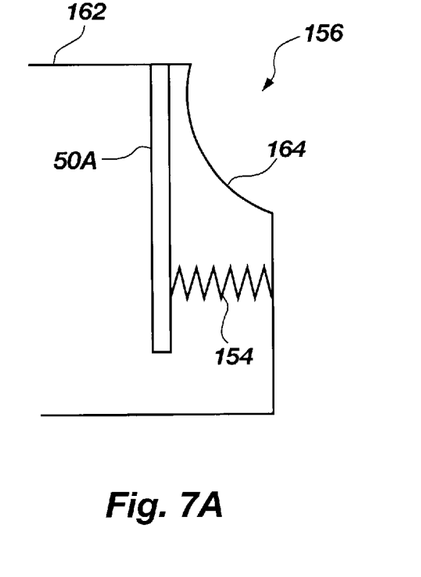
FIG. 7A is a side view of another alternative system in an ordinary state.
Figure 7B:
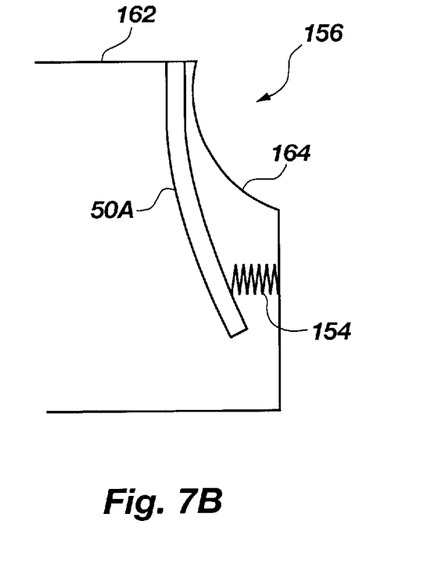
FIG. 7B is a side view of the embodiment of FIG. 7A in an activated state.

Other embodiments of detection systems include the following. In FIGS. 7A and 7B, deflection sensor 50A supported by chassis 162, is ordinarily held in place by a spring 154 of a system 156. In response to a large change in acceleration, deflection sensor 50A deflects about deflection structure 164 as shown in FIG. 7B.

Figure 8A:
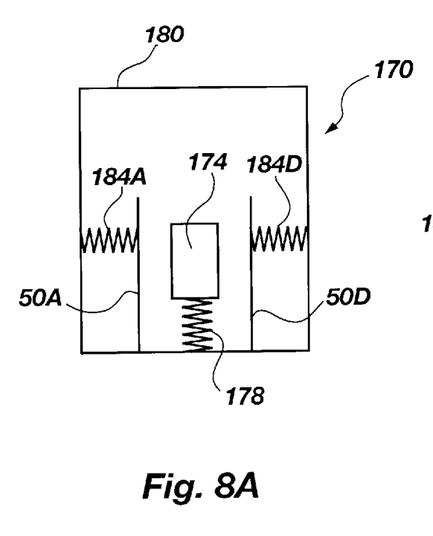
FIG. 8A is a cross-sectional view of another alternative system in an ordinary state.
Figure 8B:
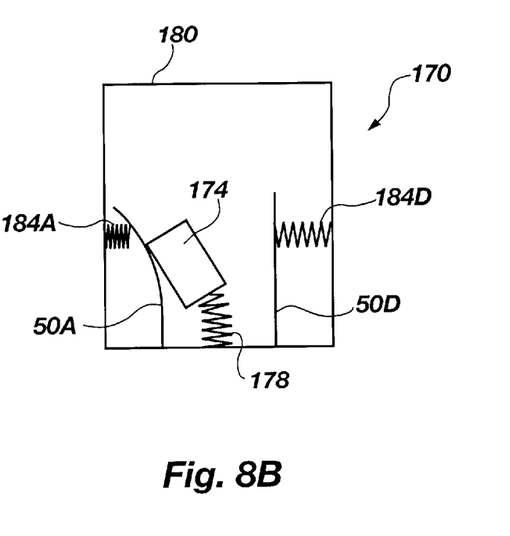
FIG. 8B is a cross-sectional view of the embodiment of FIG. 8A in an activated state.

In FIGS. 8A and 8B, in a system 170, an actuator 174 is supported by a spring 178, which in turn is supported by chassis 180. Optional springs 184A and 184D hold deflection sensors 50A and 50D in place. Deflection occurs because deflection sensors 50A and 50D are not allowed to pivot at their lower ends (whether or not springs 184A and 184D are used).

Figure 9A:
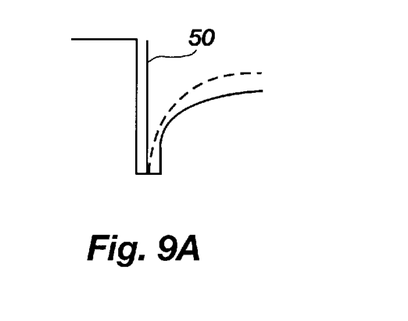
FIG. 9A is a side view of another alternative system in an ordinary state (shown in a solid line) and activated state (shown in a dashed line).
Figure 9B:
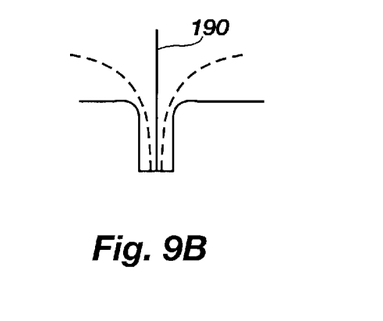
FIG. 9B is a side view of another alternative system in an ordinary state (shown in a solid line) and activated states (shown in a dashed line).

FIG. 9A shows a deflection sensor 50 for which deflection is detected only in the direction shown in dashed lines. FIG. 9B shows a deflection sensor 190 that may deflect in two directions as shown in dashed lines. Deflection sensors that deflect in two directions are discussed below.

Figure 10A:
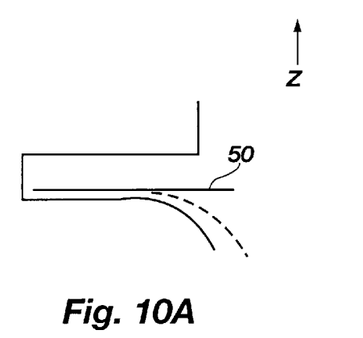
FIG. 10A is a side view of another alternative system in an ordinary state (shown in a solid line) and activated state (shown in a dashed line).
Figure 10B:
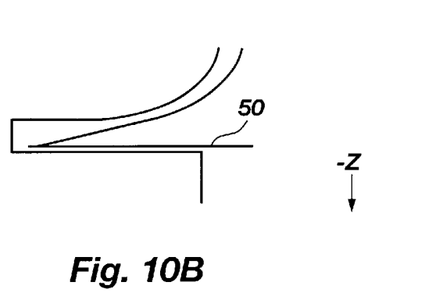
FIG. 10B is a side view of another alternative system in an ordinary state (shown in a solid line) and activated state (shown in a dashed line).
Figure 10C:
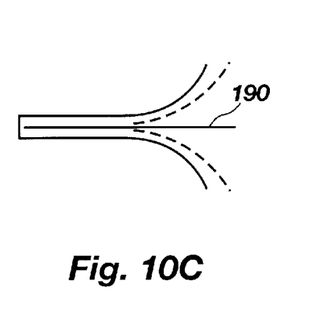
FIG. 10C is a side view of another alternative system in an ordinary state (shown in a solid line) and activated states (shown in a dashed line).
Figure 10D:
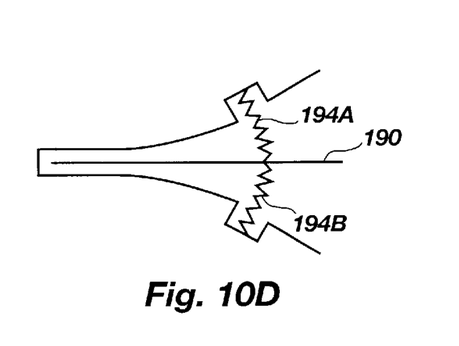
FIG. 10D is a side view of another alternative system in an ordinary state.

FIGS. 10A and 10B show a deflection sensor 50 for which deflection in the z or −z directions is detected. The deflection is shown in dashed lines. FIG. 10C shows a deflection sensor 190 for which deflection in both the z and −z direction may be detected. FIG. 10C is like FIG. 10D except that springs 194A and 194B are used.

Deflection sensors 50 and 190 may include a particularly stiff substrate that inhibits movement. Various movement inhibitors could be used in addition. Also, the associated determining circuitry may require a large threshold. Since every substrate inhibits movement at least by a small amount, the stiffness of a substrate will not be referred to herein as a movement inhibitor.

Figure 11A:
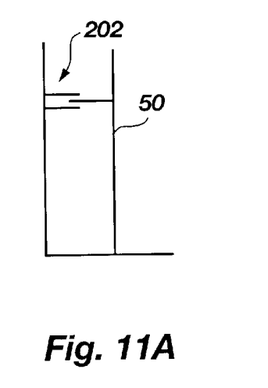
FIG. 11A is a side view of another alternative system in an ordinary state.
Figure 11B:
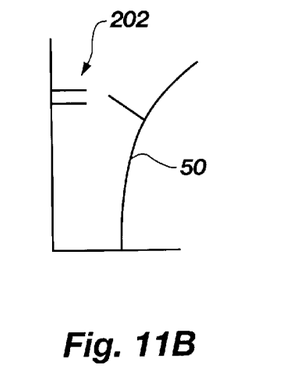
FIG. 11B is a side view of the embodiment of FIG. 11A in an activated state.

As shown in FIGS. 11A and 11B, a clip 202 may act as a movement inhibitor to deflection sensor 50. Again, if deflection sensor 50 is not allowed to pivot, it will deflect without a separate deflection structure. The structure that prevents pivoting may be through a deflection structure.

Depending on how a deflection sensor is configured, the parameter (e.g. resistance) of the deflection sensor may change in response to being deflected in only one direction or in both directions. If a deflection sensor responds to deflection in only one direction, it can change from an x to −x, y to −y, or z to −z direction by reversing the orientation of the deflection sensor.

The various features may be mixed and matched. For example, those impact detection systems illustrated herein that do not include chassis protrusions, magnets, or springs could include such features. The various embodiments show the many possibilities.

Figure 12:
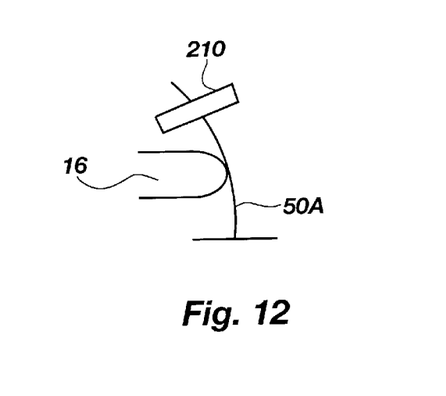
FIG. 12 is a side view of an optical detection system.

Referring to FIG. 12, an optical detection system 210, such as a photodiode and detection or fibre optic, could be used to measure motion of a magnet or actuator.

Merely as one example, the magnitude of a force, such as is caused by a collision, could be determined as follows. First, measurements may be taken to determine how much force it takes to overcome the magnetic attraction between magnetic pieces. Measurements could also be made to determine how much force is required to deflect a particular deflection sensor by a particular amount. These could be in the form of a look up table or an equation. It may also have to be factored in how much force is absorbed by the body of the vehicle. This would vary depending on what part of the car is struck.

For example, assume that the force absorbed by the vehicle is $F_A$, the force required to overcome the magnetic force is $F_M$, and the force required to deflect a flexible potentiometer by x is force $F_x$. The force of a collision $F_C$ would then be $F_A + F_M + F_x$.

The force absorbed by vehicles may be gathered by vehicle manufacturers.

A variable resistance material (e.g. variable resistance material 40 in FIGS. 2A and 2B) is applied to a substrate to create a flexible potentiometer. Flexible potentiometers are marketed under the mark Bend Sensor™ by Flexpoint, Inc., 656 West 7250 South, Midvale, Utah, 84047, which is associated with inventor Gordon B. Langford. Deflection sensors, other than flexible potentiometers, may have another electrical parameter that is altered through deflection. The variable resistance material may be formed of an electrically conductive ink which predictably changes electrical resistance upon deflection or bending between a first configuration and a second configuration. Various types of phenolic resin materials are presently believed to be suitable for the variable resistance material. For example, a phenolic resin Formula 3609 that has been manufactured by Electronic Materials Corporation of America (EMCA-REMEX Products, Ablestik Electronic Materials & Adhesives), 160 Commerce Drive, Montgomeryville, Pa., 18936, has been found suitable in that it is elastically flexible or bendable for many thousands of cycles or bends.

The variable resistive material may be a two-part epoxy material, a thermoset adhesive, or a thermoplastic, all incorporating conductive material such as graphite or carbon. The variable resistance material may include a carbon ruthenium.

Merely examples, the substrate may be from about 0.005 to about 0.010 inches in thickness (although various other thicknesses may be acceptable); the variable resistive material may be from about 0.0003 to about 0.001 inches in thickness (although various other thicknesses may be acceptable).

To attach to a substrate, the variable resistance material may include a material which facilitates wetting, gluing, or sticking. The variable resistance material may include graphite in combination with a binder. The variable resistance material is preferably of the type which is applied to the substrate in liquid form and which in turn dries to a solid form.

The substrate may be constructed of various materials including various polymers, such as polyamide, polycarbonate, polyimide (Kapton), and polyester (Mylar), which may be thermoplastics.

A resistive grid or flexible potentiometer may be used to measure a degree or angle of deflection. The more the deflection, the less the resistance. With measurements, a relationship between the degree or angle of deflection and the resistance can be developed and used in software, that would be relatively simple to create.

Segmented constant resistance conductive material may be used in combination with a flexible potentiometer to reduce the resistance and help linearize changes in resistance. The segmented conductors may be made of silver, silver alloys, or other conductive metals, as well as conductive carbon-based compounds. The segmented conductors may be applied in a liquid form, or applied in a solid form which is pressed onto the variable resistance material. The conductivity of the segmented conductors remains essentially constant upon deflection. Therefore, the segmented conductors provide paths for electrical current that are in parallel with the path provided by the variable resistance material. The segmented conductors act as attenuators. It is believed that the segmented conductors may help to make the resistance versus load curve of a flexible potentiometer more linear. The segmented conductors may help make the resistance at a particular deflection configuration more consistently repetitive.

The variable resistance material may be spray painted, rolled, silk screened, or otherwise printed onto the substrate. The variable resistance material may be a solid which is pressed onto the substrate. A conductive substrate may be used. The substrate may be connected to a particular potential, such as ground. A non-conductive coating may be applied to the substrate.

It is believed but not known that as a flexible potentiometer (of some or all compositions), is deflected or bent, the variable resistance material cracks or deforms. That is, in some or all compositions, dried variable resistance material has a granular or crystalline-type structure which cracks or breaks upon deflection. As the variable resistance material deflects, the number of cracks and the space between them is believed to increase, thereby changing the electrical resistance in a predictable manner. The change can be measured upon application of suitable electrical signals.

Figure 13:
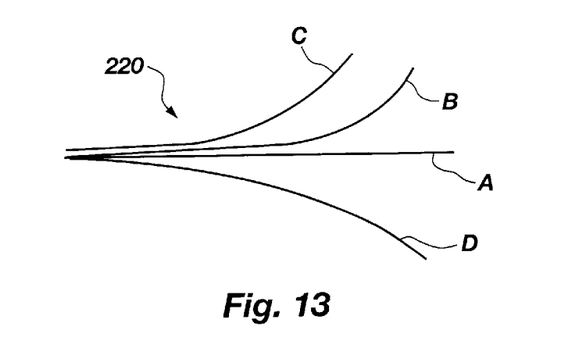
FIG. 13 is a side view of a flexible potentiometer in various degrees of deflection.

Certain flexible potentiometers have a substantial change in resistance only when deflected in a first direction from a straight position, not when deflected in an opposite direction from a straight position. For example, FIG. 13 shows a side view of a flexible potentiometer 220 at various degrees of deflection, denoted A, B, C, and D. Flexible potentiometer 220 is a flexible potentiometer having a substrate on which a layer of variable resistance material is applied. At deflection degree A, which is straight, flexible potentiometer 220 has a resistance $R_A$. At deflection degree B, flexible potentiometer 220 has a resistance $R_B$, which is substantially greater than resistance $R_A$. At deflection degree B, the level of resistance $R_B$ is predictable and repeatable. At deflection degree C, flexible potentiometer 220 has a resistance $R_C$, which is substantially greater than resistance $R_B$ and is predictable and repeatable. Accordingly, as the deflection changes from degree C to degree B, there is a predictable and repeatable decrease in resistance. However, at deflection degree D, in flexible potentiometer 220, there may be only a small change in resistance from resistance $R_A$.

Other flexible potentiometers change resistance in either direction from a straight position. There are various ways of constructing a deflection sensor that senses deflection in two directions from the straight position. Under a first construction, a first layer of variable resistance material is applied to one side of a substrate and a second layer of variable resistance material is applied to the other side of the substrate. The first layer is connected between a first set of conductors, and the second layer is connected to a second set of conductors. When the substrate (along with the variable resistance material) is deflected in a first direction, the resistance between the first set of conductors increases by a repeatable and predictable amount, and when the substrate is deflected in a second direction, the resistance between the second set of conductors decreases by a repeatable and predictable amount.

Under a second construction, a layer of antimony tin oxide is applied over a substrate (e.g. a Kapton substrate), and a layer of variable conductive material is applied to the layer of antimony tin oxide. An extra layer of carbon may be applied over the layer of variable conductive material. When the substrate is deflected in a first direction from the straight position, the resistance of the variable resistance material increases by a predictable and repeatable amount. When the substrate is deflected in a second direction from the straight position, the resistance of the variable resistance material decreases by a predictable and repeatable amount.

Under another technique, a layer of variable resistance material is applied to a single side of a substrate. The substrate is deflected to an initial setting so that the variable resistance material has an initial resistance value greater than that of the straight position. As the deflection of the substrate is increased from the initial setting, the resistance increases. As the deflection of the substrate is decreased from the initial setting, the resistance decreases. One end of the flexible potentiometer may be weighted and the deflection may be about a pivot point.

An impact detection system according to the present invention may be made with switches, such as a membrane switch rather than a deflection sensor. In a membrane switch, the amount of resistance decreases as the force against the switches increases.

As used in the claims, the term "connect," "connectable," or "connected to" are not necessarily limited to a direct connection. The context is useful in determining the intent.

The movement detection system also may be used to detect skidding or other movement of the vehicle or control anti-lock brakes, or other anti-skid mechanisms.

The term chassis is not intended to be restrictive but rather inclusive. Indeed, a chassis may be comprised of one or multiple parts.

Having thus described in detail preferred embodiments of the present invention, it is to be understood that the invention defined by the appended claims is not to be limited by particular details set forth in the above description as many apparent variations thereof are possible without departing from the spirit or scope thereof.

What is claimed is:

1. An acceleration change detector comprising:

a support;

a deflection sensor suspended from said support and extending away therefrom, said deflection sensor being formed to have a first portion and a second portion each being positioned to extend away from said support and to extend at least in part along an axis in an at rest position, and said deflection sensor being formed to have said second portion deflectable relative to said first portion from said at rest position to a displaced position in which said second portion is deflected away from said axis upon application of an acceleration force to said support of a magnitude to displace said second portion from said at rest position to said displaced position, said second portion being deflectable about a deflection point between said first portion and said second portion, said first portion and said second portion each being formed of a flexible substrate with an electrically conductive material deposited to extend from said first portion onto said second portion, said electrically conductive material having an electrical resistance that undergoes an ascertainable change in electrical resistance upon deflection of the second portion about said deflection point from said at rest position to said displaced position;

movement inhibitor means positioned proximate said deflection sensor to inhibit said second portion from deflecting from said at rest position to said displaced position until said acceleration force exceeds a threshold acceleration force; and a deflection structure against which said second portion of said deflection sensor deflects when urged to said displaced position upon application of said acceleration force above said threshold acceleration force to said support.

2. The acceleration change detector of claim 1, further comprising determining circuitry that is connected to the deflection sensor to sense change in said electrical resistance of said electrically conductive material deposited on said substrate of said deflection sensor, said determining circuitry generating deflection signals indicative of said at rest position and said displaced position of said second portion.

3. The acceleration change detector of claim 2, further comprising air bag triggering circuitry connected to said determining circuitry to receive said deflection signals indicative of said at rest position and said displaced position, said air bag triggering circuitry being configured for connection to remotely positioned inflation structure having an air bag associated therewith and said air bag triggering circuitry being configured for generating and supplying an inflate signal to said remotely positioned inflation structure for use by said remotely positioned inflation structure to cause inflation of said air bag, and wherein said air bag triggering circuitry is configured to said inflate signal upon receipt of said deflection signal from said determining circuitry.

4. The acceleration change detector of claim 1, wherein said movement inhibitor includes a first magnet connected to said substrate of said second portion and a second magnet fixedly positioned to be moveable when said support moves.

5. The acceleration change detector of claim 1, wherein said deflection sensor is a flexible potentiometer, wherein said substrate is elastically deformable, wherein said electrically conductive material is a conductive ink deposited on said substrate to form an electrical component which has a resistance that varies upon deflection of said substrate.

* * * * *